(12) United States Patent
Drachenberg et al.

(10) Patent No.: US 10,978,849 B2
(45) Date of Patent: Apr. 13, 2021

(54) USER DEFINED INTENSITY PROFILE LASER BEAM

(71) Applicant: Lawrence Livermore National Security, LLC., Livermore, CA (US)

(72) Inventors: Derrek R. Drachenberg, Livermore, CA (US); Jay W. Dawson, Livermore, CA (US); Gabriel M. Guss, Manteca, CA (US); Paul H. Pax, Livermore, CA (US); Alexander M. Rubenchik, Livermore, CA (US); Manyilibo J. Matthews, Livermore, CA (US)

(73) Assignee: LAWRENCE LIVERMORE NATIONAL SECURITY, LLC, Livermore, CA (US)

( * ) Notice: Subject to any disclaimer, the term of this patent is extended or adjusted under 35 U.S.C. 154(b) by 0 days.

(21) Appl. No.: 16/263,422

(22) Filed: Jan. 31, 2019

(65) Prior Publication Data
US 2020/0251872 A1 Aug. 6, 2020

(51) Int. Cl.
*H01S 3/067* (2006.01)
*H01S 3/10* (2006.01)
(Continued)

(52) U.S. Cl.
CPC ...... *H01S 3/06729* (2013.01); *B23K 26/0617* (2013.01); *B29C 64/268* (2017.08);
(Continued)

(58) Field of Classification Search
CPC ............. H01S 2301/20; H01S 3/10038; H01S 3/10053; B23K 26/0617; B29C 64/268; G02B 5/28–289
See application file for complete search history.

(56) References Cited

U.S. PATENT DOCUMENTS

| 4,901,718 | A | 2/1990 | Bille et al. |
| 7,235,781 | B2 * | 6/2007 | Haase ............... H01J 49/164 250/288 |

(Continued)

FOREIGN PATENT DOCUMENTS

| CN | 1529830 A | * | 9/2004 | ......... G02B 19/0014 |
| WO | WO-2014064636 A2 | * | 5/2014 | ................ G01J 9/00 |
| WO | WO-2018118807 A1 | * | 6/2018 | ......... G02B 6/29331 |

OTHER PUBLICATIONS

Chen et al., "Design of add-drop multiplexer based on multi-core optical fibers for mode-division multiplexing," Optics Express, vol. 22, No. 2, 2014, pp. 1440-1451.
(Continued)

*Primary Examiner* — Joshua King
(74) *Attorney, Agent, or Firm* — John P. Wooldridge

(57) ABSTRACT

A high-power laser beam with an arbitrary intensity profile is produced. Such beam has a variety of uses including for laser materials processing such as powder bed fusion additive manufacturing. Several challenges in additive manufacturing are mitigated with the present non-uniform intensity laser profiles. Nonuniform shapes include a set of intensity pixels in a line that could print a wide stripe area instead of just a single line. One example uses the multimode interference pattern from the output of a ribbon fiber which is imaged onto a work piece. The interference pattern is controlled to allow turning on or off of 'pixels' along a line which can be used to shape the beam and form the additively manufactured part.

30 Claims, 12 Drawing Sheets

(51) Int. Cl.
*H01S 3/23* (2006.01)
*B29C 64/268* (2017.01)
*B23K 26/06* (2014.01)
*H01S 3/00* (2006.01)

(52) U.S. Cl.
CPC .......... *H01S 3/0085* (2013.01); *H01S 3/1001* (2019.08); *H01S 3/1003* (2013.01); *H01S 3/10015* (2013.01); *H01S 3/10038* (2013.01); *H01S 3/10053* (2013.01); *H01S 3/2308* (2013.01); *H01S 2301/20* (2013.01)

(56) References Cited

U.S. PATENT DOCUMENTS

| | | | | |
|---|---|---|---|---|
| 7,385,192 | B2* | 6/2008 | Haase | H01J 49/067 250/251 |
| 2002/0024727 | A1* | 2/2002 | Wilcox | H01S 3/067 359/342 |
| 2006/0071160 | A1* | 4/2006 | Haase | H01J 49/164 250/288 |
| 2013/0294468 | A1* | 11/2013 | Sridharan | H01S 3/10053 372/29.02 |
| 2015/0340835 | A1* | 11/2015 | Sridharan | H01S 3/06729 359/341.1 |
| 2016/0041397 | A1* | 2/2016 | Lissotschenko | H01S 3/06708 385/33 |

OTHER PUBLICATIONS

Fan et al., "Coherent (phased array) and wavelength (spectral) beam combining compared," Proc. SPIE 5709, Fiber Lasers II: Technol. Syst. Appl., 2005, pp. 157-164.

Gu et al., "Laser additive manufacturing of metallic components: materials, processes and mechanisms," Int. Mater. Rev., vol. 57, No. 3, 2012, pp. 133-164.

Gusarov et al., "Residual Stresses at Laser Surface Remelting and Additive Manufacturing," Phys. Procedia 12, 2011, pp. 248-254.

Leon-Saval et al., "Photonic laterns: a study of light propagation in multimode to single-mode converters," Optics Express, vol. 18, No. 8, 2010, pp. 8430-8439.

Hodge et al., "Implementation of a thermomechanical model for the simulation of selective laser melting," Comput. Mech., vol. 54, 2014, pp. 33-51.

Schleifenbaum et al., "Direct photonic production: towards high speed additive manufacturing of individualized goods," Prod. Eng. Res. Devel., vol. 5, 2011, pp. 359-371.

Sillard et al., "Few-Mode Fiber for Uncoupled Mode-Division Multiplexing Transmissions," ECOC Tech. Digest, 2011, pp. 1-3.

Sridharan et al., "Mode-converters for rectangular-core fiber amplifiers to achieve diffraction-limited power scaling," in Optics Express, vol. 20, No. 27, 2012, pp. 28792-28800.

Yerolatsitis et al., "Adiabatically-tapered fiber mode multiplexers," Optics Express, vol. 22, No. 1, 2014, pp. 608-617.

Yerolatsitis et al., "Higher Order Mode Convertors for "Ribbon" Fibre," J. of Lightwave Tech., vol. 33, No. 6, 2015, pp. 1182-1185.

Zhou et al., "Coherent Beam Combining of Fiber Amplifiers Using Stochastic Parallel Gradient Descent Algorithm and Its Application," IEEE J. Sel. Top. Quantum Electron., vol. 15, No. 2, 2009, pp. 248-256.

* cited by examiner

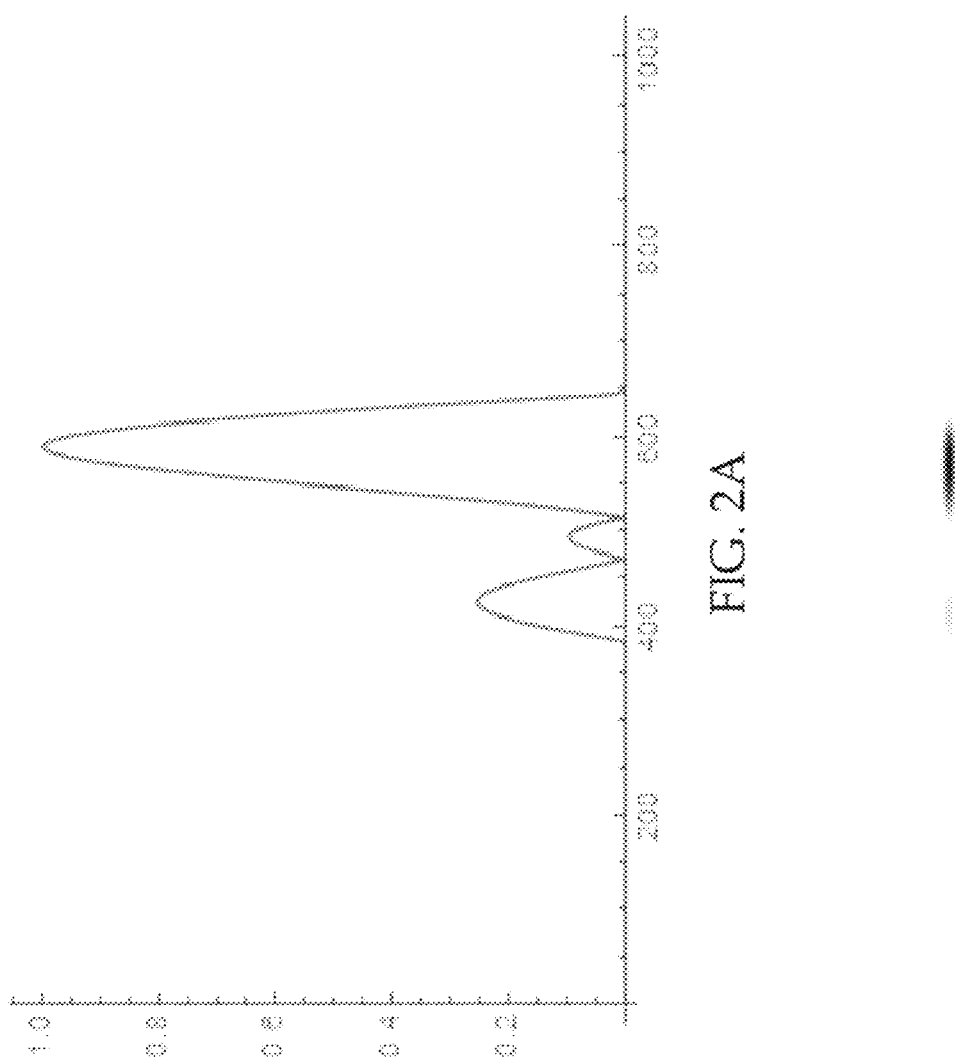

USER DEFINED INTENSITY PROFILE LASER BEAM

STATEMENT REGARDING FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND OF THE INVENTION

Field of the Invention

The present invention relates to laser materials processing, and more specifically, it relates to techniques for producing a desired intensity profile laser beam for use in laser-based additive manufacturing.

Description of Related Art

The recent growth of additive manufacturing technology—also known as 3D printing—and use in industry and government has spurred interest at Lawrence Livermore National Laboratory (LLNL) in improved lasers and techniques for laser-based printing. Laser based additive manufacturing has been accomplished by the use of a single Gaussian beam incident on the printing surface. The power of this beam when on is typically constant as it writes and the profile of the beam is constant while printing. There are several challenges that arise when printing metal objects with laser heating. Such challenges include throughput, localized overheating at part edges, or along thin sections which can lead to defect creation, surface roughness, residual thermal stresses and undesirable solidification phases when treating alloys.

SUMMARY OF THE INVENTION

The purpose of the present invention is to produce a high-power laser beam with an arbitrary (i.e., user defined) intensity profile for laser materials processing such as powder bed fusion additive manufacturing. Several challenges in additive manufacturing could be mitigated with patterned intensity laser profiles. Patterned intensity profiles include a set of intensity pixels in a line that could print a wide stripe area instead of just a single line. A specific method is presented to optimize the throughput and quality of a powder bed fusion additive manufacturing process. Generally, embodiments use a mode selective element to produce the output beam. In some embodiments, the mode selective element is a ribbon fiber laser used to produce a wide stripe beam. The output of a ribbon laser is naturally multimode and exhibits a complicated and varying intensity pattern that is nevertheless deterministically dependent on the phase and intensity of the excited modes. This seemingly non-ideal spatial distribution can be exploited in line scanning systems and can be used to scan faster along a 2D plane than a point source but requires more power than can be typically carried in a single mode fiber. By combining a line scanner directly with an extended line source, a simplified approach is presented for applications that require fast scanning of high power laser beams. In order to convert the randomly varying intensity profile to a profile of choice, a chosen set of modes is excited such that the multimode interference pattern at the output of the fiber exhibits the desired print profile. This profile is then relayed with a lens imaging system onto the additive manufacturing print plane. Several methods exist that could excite a specific/desired set of modes. 1) Evanescent coupling from a set of coupled waveguides. 2) Adiabatic mode transformation through a taper (Photonic Crystal Lanterns). 3) A spatial light modulator can be used to seed an input profile to a ribbon amplifier. More details on each of these methods will be discussed later.

One general challenge in additive manufacturing is the speed at which objects can be printed, i.e., throughput. Higher throughput is typically desired in any printed part. The speed at which objects can be printed in part depends on the intensity of the laser, but also depends on the spatial resolution (pixel size) of the printing process, governed by the size of the beam on the part. In addition, printing quality dictates the scale and dynamics of the heat deposition from the laser to the part during the process, so that choosing a desired resolution establishes an upper bound on the laser power, and hence printing speed. However, if the spatial intensity profile of the beam could be expanded to cover several pixels and arbitrarily patterned, such as in the present invention, a higher power beam could be swept across the part, printing several rows of pixels in parallel, with a commensurate increase in printing speed. In the present invention, an example profile is provided with a wide stripe of laser intensity such that the intensity can be shaped in the wide dimension. This allows much higher throughput of printed parts while still maintaining high feature resolution.

Also, many parts of interest have fine detail around the periphery of the part but are solid material without features in the center. Another option to enhance throughput is to utilize two shaped beams that are used either in a high speed "bulk" regime or a low speed "detail" regime. The high-speed beam can be large and have low resolution shaping while the low speed "detail" beam can have a smaller overall spot and have finer detail to the beam shaping.

Another challenge addressed by the present invention is localized overheating at the part edge. Laser printing of a metal is accomplished by melting a metal powder onto a metal substrate surface. This substrate surface can be a starter metal piece or it can be previously printed material below the current level. The melting is accomplished by heating both the powder and the substrate to induce mixing. Heat in the substrate propagates in all directions within the substrate. However, when an edge is encountered, the heat in the substrate cannot propagate in all directions but is confined to a smaller volume which results in overheating the material near this edge. If the laser can be selectively dimmed, such as with a beam exhibiting an arbitrary intensity profile according to the principles of the present invention, the quantity of deposited heat can be limited to an appropriate amount when near these edges. Fraunhofer's "skin-core" approach is an example technology to address this issue.

A third challenge addressed by the present invention is localized overheating at features that have no substrate. Many 3D printed parts have features that gradually expand in the transverse dimensions with increased vertical dimension. In order to create these features in laser printing of metal parts, the metal powder must be heated without any substrate material below, but only to the side or diagonal to the powder. Typically, a large portion of the laser energy is deposited in the substrate, but in these cases where no substrate exists, the laser can deliver too much energy, overheat the region and produce what is referred to as 'overhang' regions in a build. In the present invention, beams with an arbitrary intensity profile can mitigate this issue by lowering the power selectively near these cliff features, while simultaneously maintaining higher powers away from them.

Another challenge addressed by the present invention is residual thermal stresses that arise from local heating in laser printed parts. If, however, a region surrounding the localized print area were kept at an elevated temperature, the residual thermal stresses should be mitigated. This could be accomplished by elevating the temperature of the entire part in an oven, but this is not feasible for large parts. Utilizing the principles of the present invention, this challenge is addressed by heating the area surrounding the print area with multiple or shaped laser beams to tailor the cooling profiles which drive residual stress. Ultimately, the goal is to shape the thermal profile on the writing surface with a shapeable beam. To this end, one such profile would be an elongated donut shape in which there is an intensity dip in the center of a beam to prevent overheating, and an elongation of the donut to allow for a tailored cooling rate in the temporal domain behind area of writing. Additionally, a shaped beam, according to the present invention, which exhibits a peak and a long tail trailing behind the peak allows tailoring of the cooling profile of the metal. In the limiting case, the arbitrary beam can be Gaussian shaped so that industry standard recipes would still work while having the option to re-shape the beam to improve outcomes. Cooling rates are also known to affect metal alloy microstructure and hence mechanical properties, making control through laser irradiation attractive for these reasons as well.

Laser materials processing of metal also presents an opportunity for adaptive beam shaping. When welding layers of two different metals together, it is important to ensure mixing. Merely melting both metals is not sufficient to provide a good bond. In this case, a beam with a large number of small spots within the full beam would be ideal to promote mixing. This can be accomplished with the present invention by producing a beam with laser speckle of a specific size or by producing a beam with sub-lobes of a specific desirable size to promote mixing. Laser speckle is a result of the interference pattern produced when multiple interacting beams or multiple modes within a single beam are present.

The present invention would find broad use in laser materials processing such as additive manufacturing. This invention enables the use of off-axis highly elliptical beams to illuminate broad areas. Transverse intensity profile adjustments can be made to broadly select regions to be illuminated and to minimize local overheating, as well as secondary substrate heating to prevent residual thermal stress. The present invention can be used in any application which requires optimal and/or wide area laser processing of surfaces such as in laser welding, cutting and polishing.

Some embodiments of the method include a gain material forming a laser or amplifier, mode or phase and amplitude control and feedback to the phase control.

The gain material, for example, can be an optical fiber which has an elongated lasing region, i.e., a ribbon fiber. This ribbon fiber can then be re-imaged onto a 3D printing surface to form a line scanner, enabling printing at a much higher rate. To be effective, the intensity profile along the long axis of the ribbon fiber is controlled in "pixel" regions. This allows the printing to be "on" or "off" at any point along the long axis of the line scanning ribbon fiber. The result is the ability to 3D-print multiple lines in parallel with a single laser. Control of the intensity profile at the output of the fiber can be accomplished by selectively launching a specific set of modes at the input, or by adaptive optics at either the input or output. The ribbon fiber is specific example of a gain medium, but other gain mediums could be used and are included in this invention.

Mode or phase and amplitude control can be accomplished by selectively launching modes at the input, by phase and amplitude control at the input or by phase and amplitude control at the output. If an adaptive optics element (liquid crystal, deformable mirror, etc.) or modal control is to be used at the input to control the output profile, the gain medium must support a few modes such that the interference between the modes could provide the desired output profile. If, however, an adaptive optics element (liquid crystal, deformable mirror, etc.) is used at the output, the gain medium should be single mode so that the adaptive optics element can convert the single mode output into the desired profile. The advantage of using mode control at the input rather than adaptive optics at the output is that the control optics can operate on a low power seed at the beginning of an amplifier thus reducing the cost and complexity of the system. In addition to phase and amplitude control, the use of goniometers or steering mirrors to rotate and steer the beam on the printing surface would add a degree of freedom to the adaptability of the beam and potentially reduce the phase-amplitude shaping requirements of the initial beam to one dimension while still allowing the production of a two-dimensional arbitrary spatial profile on the printed surface with a small delay between different orientations of the beam.

The final required element is the use of a feedback mechanism. In one embodiment, a camera which observes a sample of the light in the image plane (the printing surface) is used to provide feedback to the modal or phase and amplitude control optics.

All three components; gain medium (few mode or single mode), mode or phase control, and feedback together form a beam with an arbitrary intensity profile on a 3D printing surface, allowing improved control of the thermal profile of the part during printing, and allowing parallel printing over a larger area with fine resolution control.

BRIEF DESCRIPTION OF THE DRAWINGS

The accompanying drawings, which are incorporated into and form a part of the disclosure, illustrate embodiments of the invention and, together with the description, serve to explain the principles of the invention.

FIG. 2A, which shows a lineout of the normalized value of the transverse electric field profile for a 3-mode combination (modes 1, 2 and 3) with equal weights.

FIG. 2B shows the transverse 2D profile of FIG. 2A.

DETAILED DESCRIPTION OF THE INVENTION

One embodiment provides the generation of arbitrary intensity profiles by multi-mode interference in a multi-mode ribbon fiber. The concept here is to generate an intensity profile with a line of regularly spaced hot-spots, or lobes, each of which can be arbitrarily turned "on" or "off"; that is, pixels. This can be accomplished by judiciously arranging interference amongst the modes of a slab waveguide. Starting with the slab mode with the desired number of lobes, the relative intensity of each lobe can be adjusted by including some portion of the other modes, with appropriate amplitude and phase, such that the coherent summation of fields yields the desired profile. Note that in this scheme, the required number of control channels is equal to (at most) the number of modes supported by the waveguide.

Selection of the required mode complex amplitudes can be done by mode filtering external to the fiber (slab) amplifier; or by seeding the amplifier with a low power pattern generated with a spatial light modulator (SLM); by evanescent coupling inside the fiber; or by other means. First, we will describe how excitation of multiple selected modes can generate any desired field profile. This will be followed by a description of several demonstrated methods of exciting specific modes or simultaneously exciting a mode set in optical fibers.

Coherent Addition of Modes in a Fiber to Generate an Arbitrary Output Profile

As an example of generating an arbitrary (desired) pattern, we will produce a 10-pixel (lobed) pattern with a random set of "on" or "off" pixels. Then we will calculate what combination of modes will produce the desired pattern. Then we will re-create the pattern from the calculated set of modes to demonstrate the process works.

Figure 1:
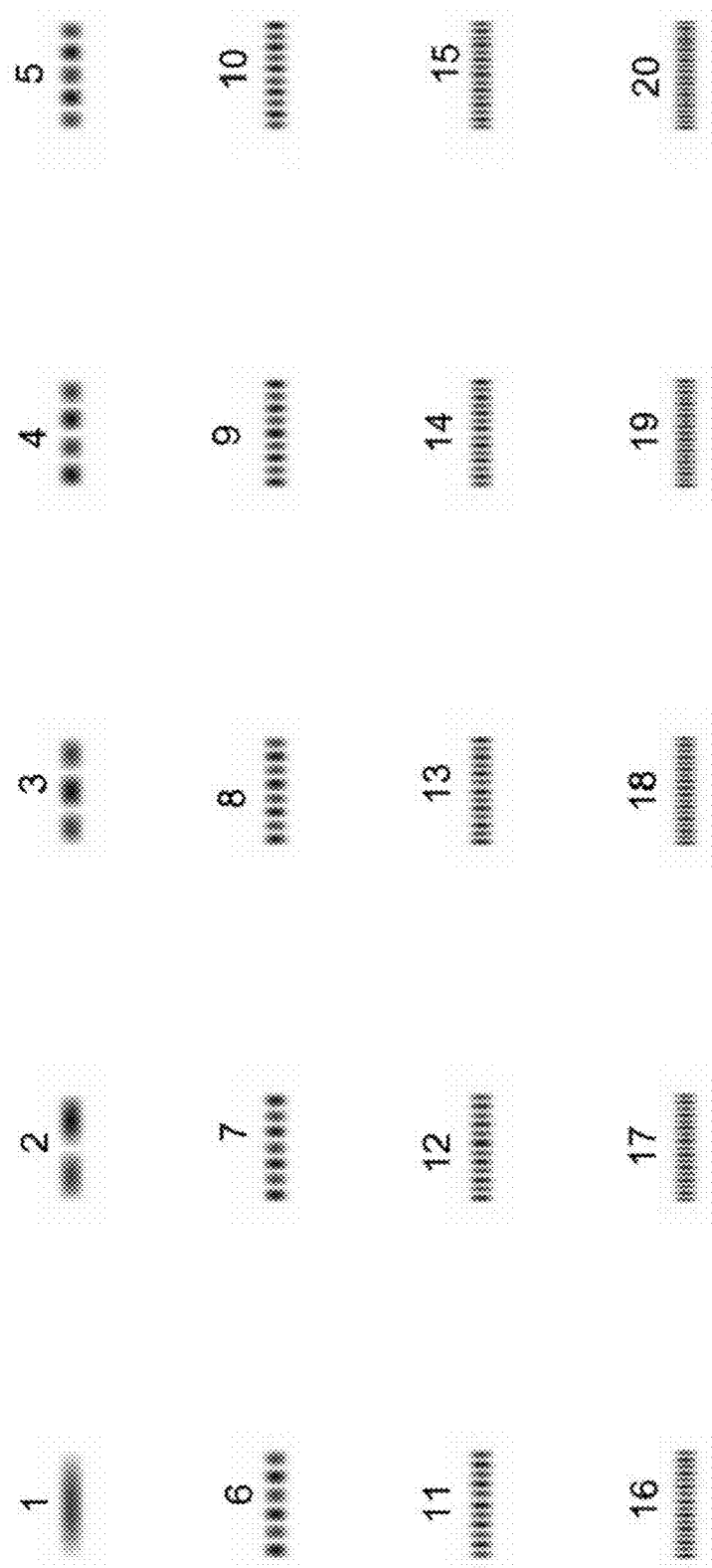
FIG. 1 shows transverse field profiles for 20 of the 38 supported modes in a 10×500 µm step-index waveguide with an NA of 0.05.

Initially a ribbon waveguide is specified from which a set of supported modes can be determined. For this example, the waveguide has a core of 10×500 μm with an NA of 0.05. The waveguide supports 38 transverse modes, but only 20 of them are necessary to accomplish the desired effect, i.e., 20 control channels are required. FIG. 1 shows field profiles for the set of supported modes used.

In general, when multiple modes are excited in a waveguide, the output is a coherent combination of those modes. For example, if modes 1, 2 and 3, from the list shown in FIG. 1 are combined with equal weight, the output will look like that of FIG. 2A, which shows a lineout of the normalized absolute value of the transverse electric field profile for a 3-mode combination (modes 1, 2 and 3) with equal weights. FIG. 2B shows the transverse 2D profile of FIG. 2A.

Figure 3A:
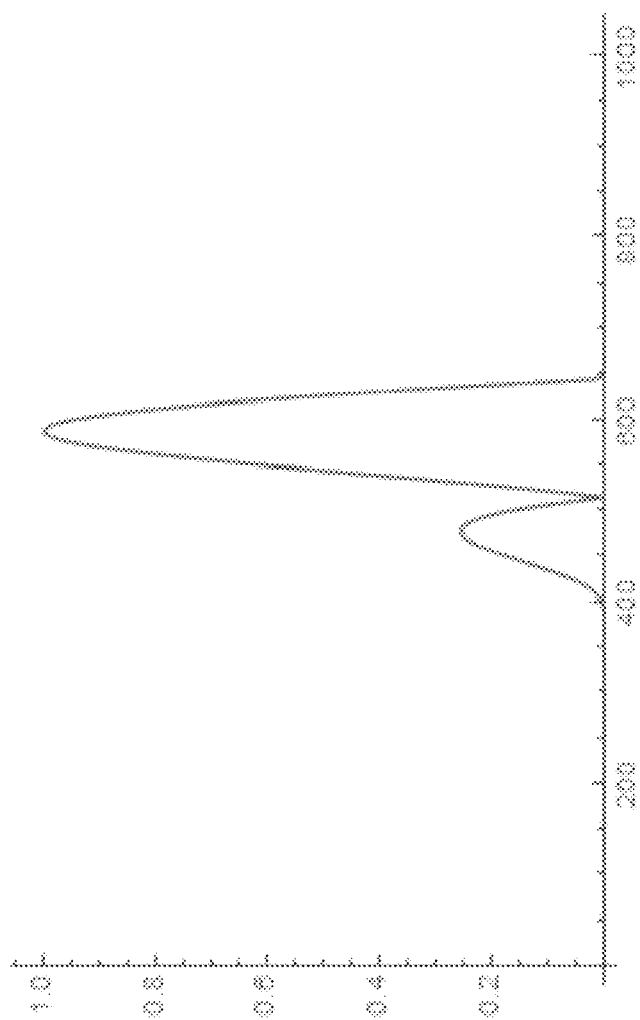
FIG. 3A, which shows a lineout of the normalized value of the transvers electric field profile for a 3-mode combination (modes 1, 2, and 3) with respective weights of (0.25, 0.5, and 0.25).
Figure 3B:
FIG. 3B shows the transverse 2D profile of FIG. 3A.

If, instead, mode 2 was given 50% of the contribution, while modes 1 and 3 were 25% each, the resulting profile would be that of FIG. 3A, which shows a lineout of the normalized absolute value of the transvers electric field profile for a 3-mode combination (modes 1, 2, and 3) with respective weights of (0.25, 0.5, and 0.25). FIG. 3B shows the transverse 2D profile of FIG. 3A.

Figure 4A:
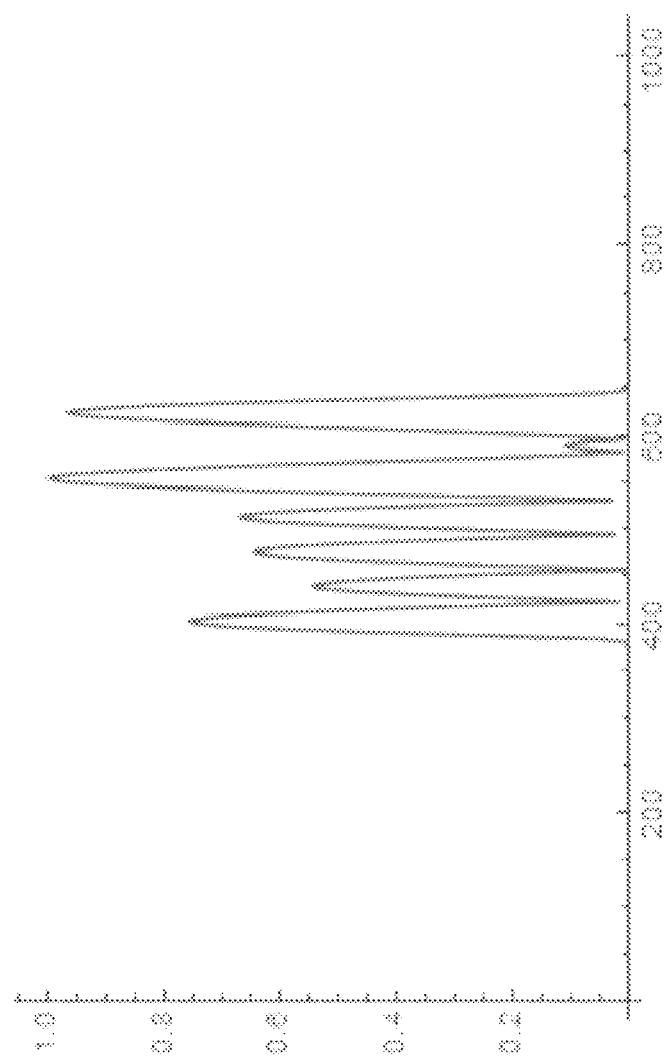
FIG. 4A shows a lineout of the normalized value of the transvers electric field profile for a 4-mode combination (modes 1, 2, 3, and 7) with respective weights of (1/6, 1/6, 1/6, and 3/6).
Figure 4B:
FIG. 4B is the transverse 2D profile of FIG. 4A.

Finally, if we include mode 7, with a weight of 50%, while each other mode splits the remaining 50%, the profile of FIG. 4A will be produced. FIG. 4A shows a lineout of the normalized absolute value of the transvers electric field profile for a 4-mode combination (modes 1, 2, 3, and 7) with respective weights of (1/6, 1/6, 1/6 and 3/6). FIG. 4B is the transverse 2D profile of FIG. 4A. Ultimately, it is not desirable to use any of the profiles that are the result of randomly selecting modes and their respective weights. It is desirable rather to choose an output profile, then calculate the set of input modes and weights that can produce the desired output.

Figure 5A:
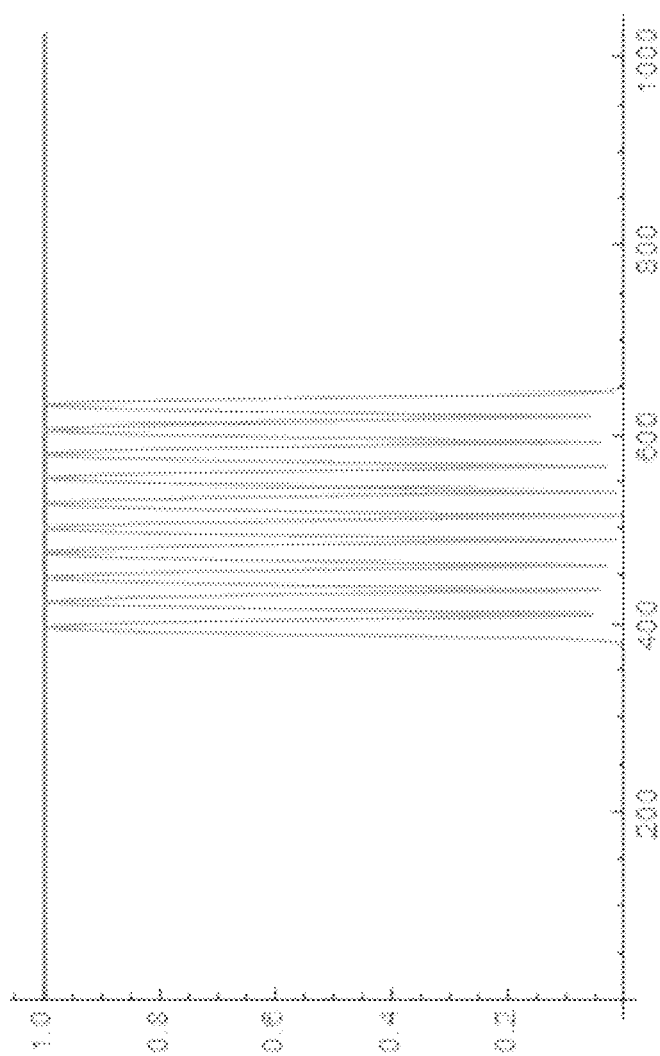
FIG. 5A shows a lineout of the normalized value of the transvers electric field profile for a pure mode 10.
Figure 5B:
FIG. 5B shows the transverse 2D profile of FIG. 5A.

In order to begin the process, a mode is selected that will serve as the base-mode, i.e., the mode that has the same number of lobes as desired pixels. In this next example, mode 10 is selected as the base-mode. FIG. 5A shows a profile of this mode. A lineout of this mode is shown below in FIG. 5B with all the pixels left in the "on" position. Thus, FIG. 5A shows the normalized absolute value of the transvers electric field profile for a pure mode 10. FIG. 5B shows a lineout of the transverse 2D profile of FIG. 5A.

Figure 6A:
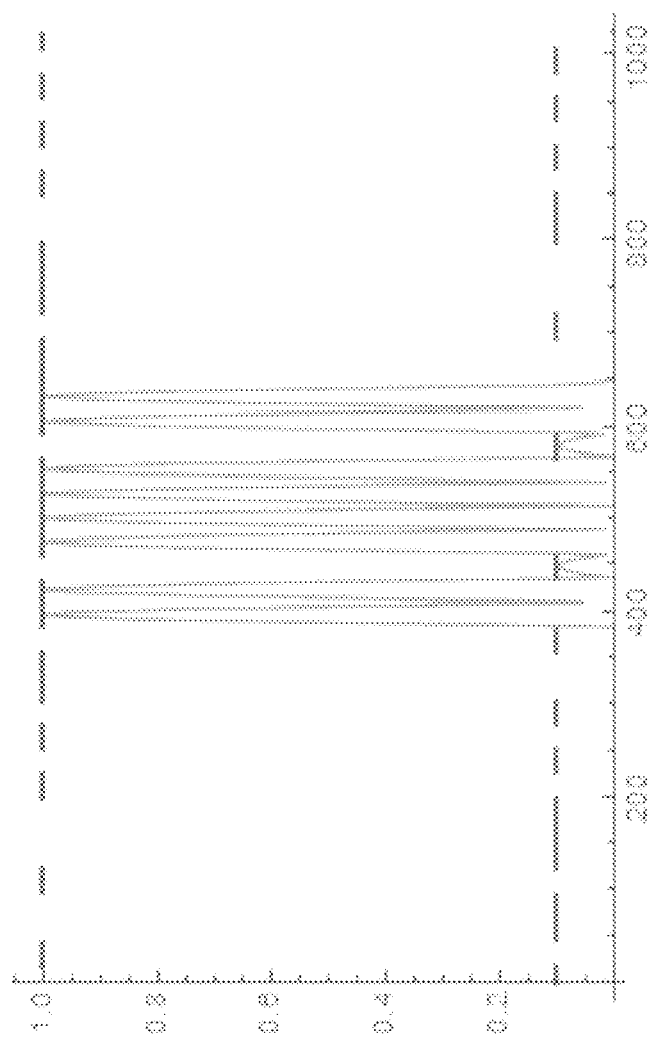
FIG. 6A shows a lineout of the normalized value of the transvers electric field profile for a 10-lobed mode with a random on/off pattern applied to each lobe in which on=100%, and off=10%.
Figure 6B:
FIG. 6B shows the transverse 2D profile of FIG. 6A.

Next in this process, a random binary pattern is applied to the pixels. This could of course be a pattern chosen by design but is kept random to show that it doesn't matter what the pattern is. FIG. 6A shows the mode of FIG. 5A with a random mask applied. FIG. 6B shows the 2D transverse profile of FIG. 6A. Notice that the "On" position is at 100%, while the off position is at 10%. The off position is allowed to be non-zero because it is much easier to reconstruct this profile if this is the case. Also, it is not necessary to bring the "off" pixels to zero if the application is 3D printing. The only requirement is that the intensity of the "off" pixel be below the intensity required to print. Thus, FIG. 6A shows a lineout of the normalized absolute value of the transvers electric field profile for a 10-lobed mode with a random on/off pattern applied to each lobe in which on=100%, and off=10%. FIG. 6B shows the transverse 2D profile of FIG. 6A.

At this point in the process, it may be unknown which set of modes could be used to re-construct this in a real system. Only the desired final profile has been set. To find the set of modes that would make-up this profile, the overlap is found between the supported modes in the fiber and the desired profile. In other words, for any supported mode, how much of it can be found in the desired profile? The required overlap calculation is determined by the relationship: (the integral of the product between one profile ($E_1$) and the conjugate of the other ($E_2^*$))/(the product of the integrals of the two profiles).

$$\text{Overlap} = \frac{\int E_1 E_2^*}{\sqrt{\int E_1 E_1^*} \sqrt{\int E_2 E_2^*}}$$

This gives the relative (generally complex) weighting of a particular mode in the desired arbitrary profile. After making this calculation with all supported modes, the set of modes are known that are required to make the desired profile.

Table 1 below shows each mode between modes 1 and 20 that contributes at least 1% of the content in the arbitrary profile in this example. Each mode number listed corresponds to a mode shown in FIG. 1. Notice that the target profile is made up of 83.4% of mode 10. This makes sense considering that a 10-lobed mode has been specified in which each of the lobe's intensity is adjusted. Also notice that the sum of the content of this set of modes represents >99% of the content of the arbitrary profile. Thus, Table 1 is a list of contributing modes and their relative contribution between modes 1 and 20. Modes 21-38 are excluded.

TABLE 1

| Mode # | Mode content |
| --- | --- |
| 2 | 0.064 |
| 6 | 0.055 |
| 10 | 0.838 |
| 14 | 0.025 |
| 18 | 0.012 |

Figures 7A, 7B:
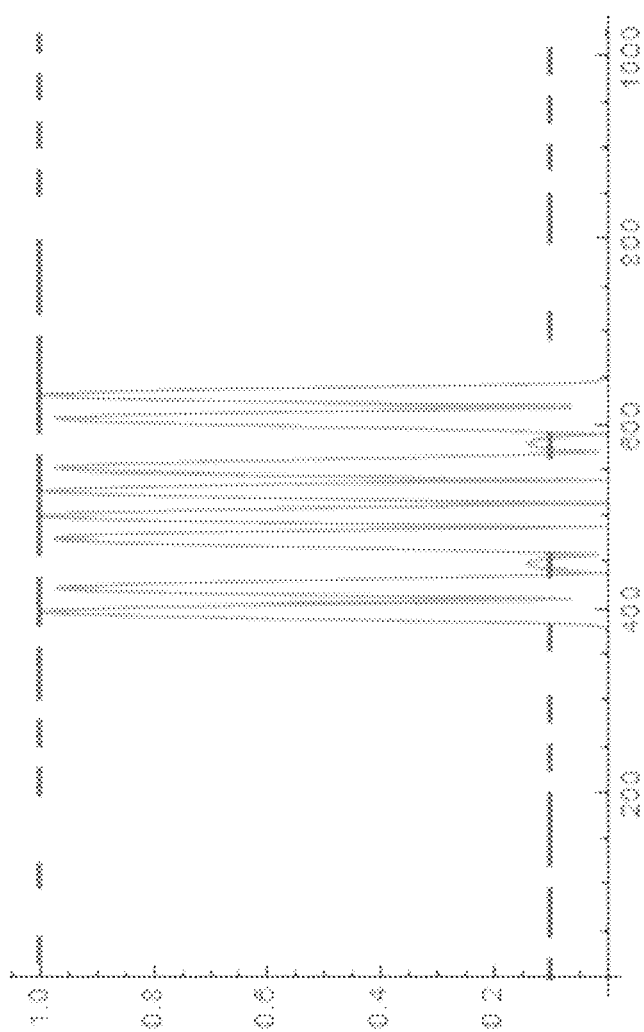
FIG. 7A shows a lineout of the normalized value of the transvers electric field profile for a mode profile reconstructed from the set of modes specified in Table 1.
FIG. 7B shows the transverse 2D profile of FIG. 7A.

Also note, the remainder of the total 38 supported modes had some small contribution to the profile but have been discarded for practical considerations. In this case, one can re-construct an output profile using the modes and relative content listed in Table 1. This reconstructed profile is shown in FIG. 7A. Although it is not a perfect reconstruction of the desired profile, it is sufficiently close for printing. Including additional modes in the reconstruction would improve the reconstruction but not significantly. FIG. 7A shows a lineout of the normalized absolute value of the transvers electric field profile for a mode profile reconstructed from the set of modes specified in Table 1. FIG. 7B shows the transverse 2D profile of FIG. 7A.

Methods of Individual Mode Excitation in an Optical Fiber
Evanescent Coupling

Evanescent (resonant) coupling from a nearby waveguide is a method of individual mode excitation in an optical fiber. LLNL has recently demonstrated a technique that can be used to couple light from a chosen mode in an input waveguide into a chosen mode in an output waveguide. This has been detailed in PCT/US2017/067096, incorporated herein by reference. Coupling is accomplished by bringing two cores together such that their evanescent fields overlap. For the modes with equal effective index, the modes will be coupled and optical energy can transfer from one to the other. To make this process modally selective, and not transfer to a set of modes, a bridge waveguide is placed in-between the two signal waveguides which provides the modal dispersion required to select only the desired mode.

Figure 8A:
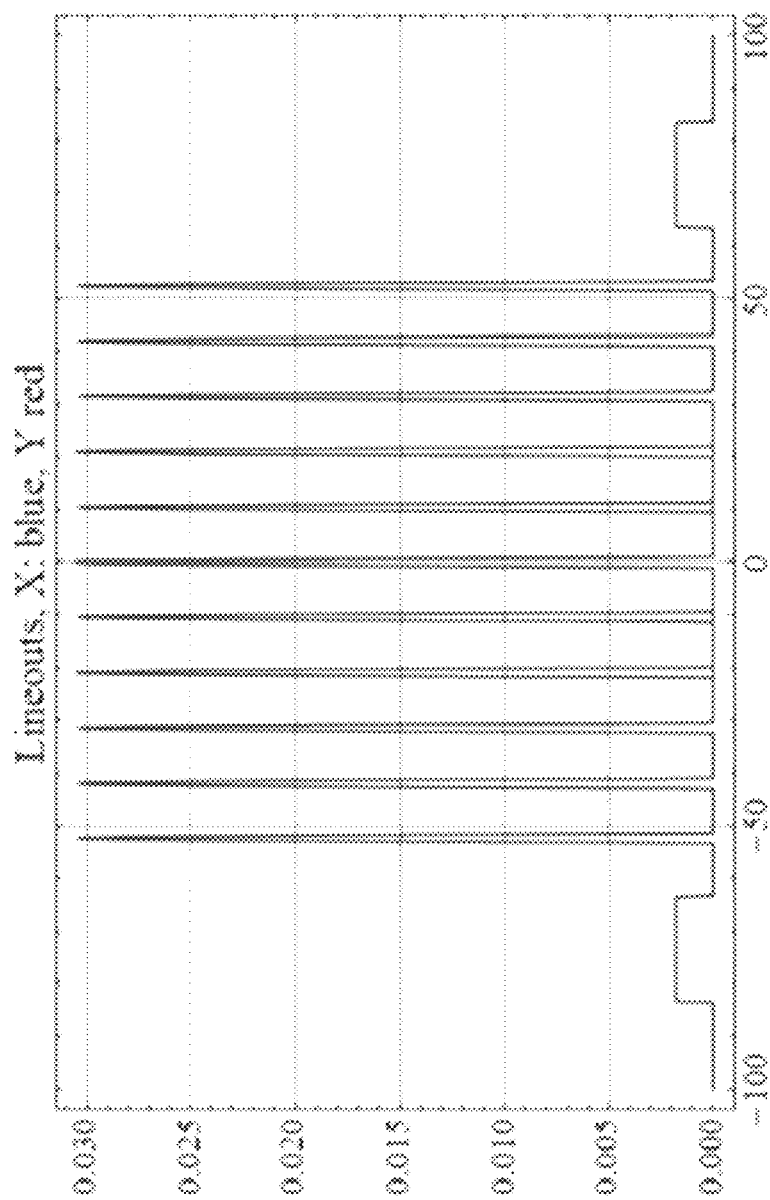
FIG. 8A shows a large area mode (LMA) bridge coupler refractive index profile.
Figure 8B:
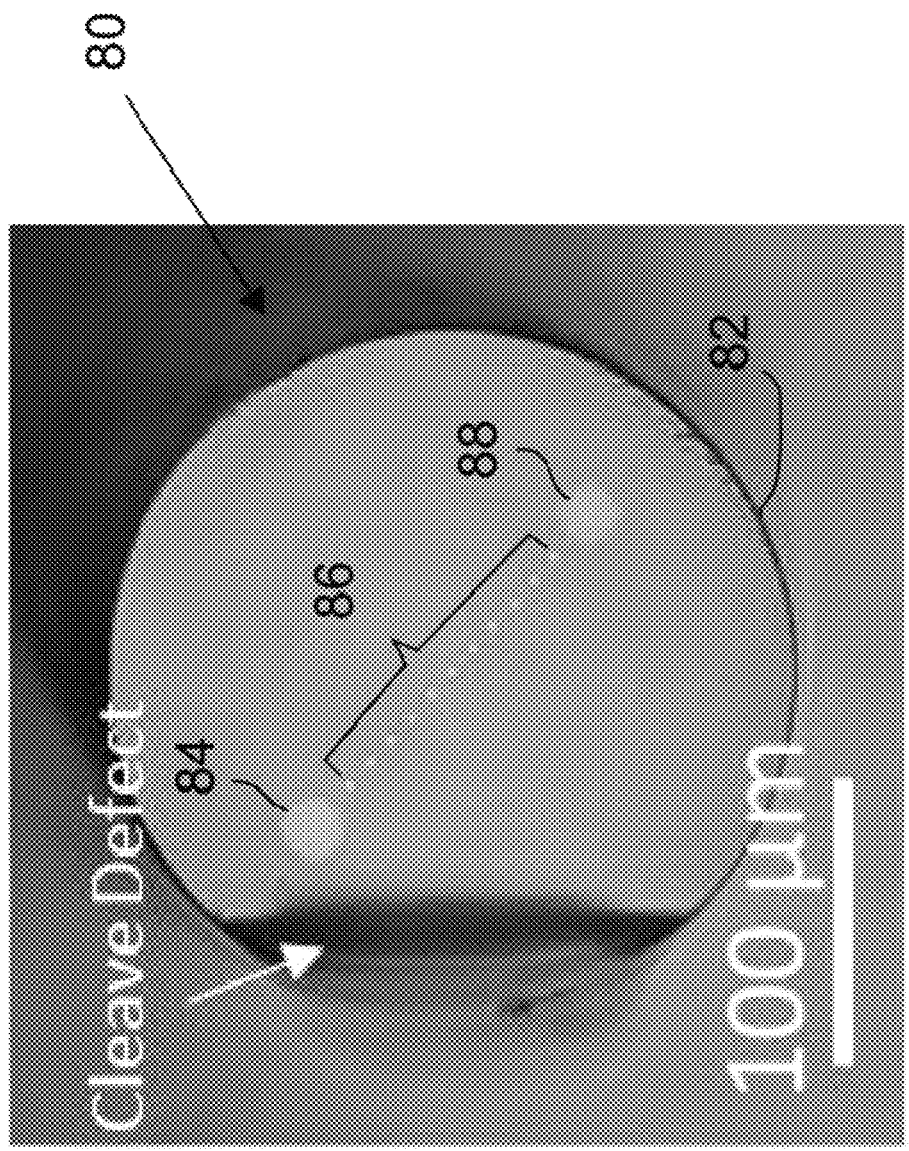
FIG. 8B shows a fabricated fiber having the profile of FIG. 8A.
Figure 9:
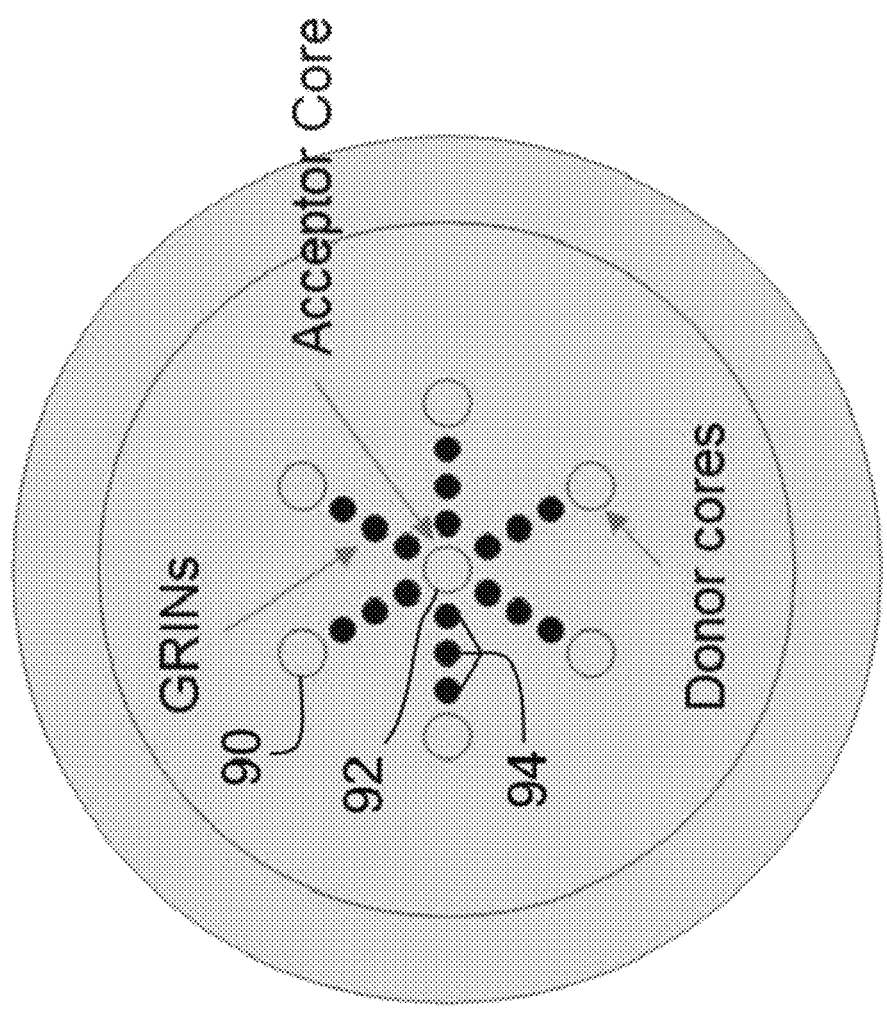
FIG. 9 shows a conceptual cross-section for a structure having multiple modally selective donor "spokes" around a central "acceptor" core.

FIG. 8A shows a large area mode (LMA) bridge coupler refractive index profile. FIG. 8B shows a fabricated fiber (or waveguide) 80 having the profile of FIG. 8A. An additional glass sleeve 82 was added to the fiber to provide mechanical stability. This is an example of a modally selective structure (mode selective element) in which a desired mode in one core (84) can couple through a bridge 86 to illuminate the same or another desired mode in the opposite core (88). In this same manner, the structure can be optimized to illuminate modes in a ribbon fiber or a slab. This is a two-core case that illuminates only one of the desired modes of the 10+ modes needed for the concept above. However, FIG. 9 shows a conceptual cross-section of a structure (e.g., a fiber, or waveguide) in which a multiple mode excitation can be achieved by placing multiple modally selective donor "spokes" 90 around a central "acceptor" core 92. In the fiber of FIG. 9, the modally selective elements (mode selective elements) through which the mode is transferred are GRINs 94. This is an example of a 6-mode excitation device. Higher numbers of modes are possible with this same technique in parallel or in series. Acceptor core 92 can alternately be a ribbon fiber core or a slab. Those skilled in the art, based on this disclosure, will recognize a variety of mode selective elements, such as a ribbon fiber, waveguide or resonant cavity, that support transverse modes having lobes only distributed along a line in one direction.

Adiabatic Mode Transformation (Photonic Crystal Lanterns)

In some embodiments, the means for directing a chosen set of modes into the laser is carried out through adiabatic mode transformation through a tapered fiber structure. Photonic crystal lanterns are one type of tapered fiber structure and can provide individual single mode input ports for a multimode output port. This is a relatively new class of fiber devices, and this individual mode illumination behavior has been demonstrated and could be applied to the generation of arbitrary beam profiles in a ribbon fiber. Photonic crystal lanterns can be made as a set of waveguides embedded inside a larger waveguide. When tapered, the inputs of the input waveguide set are adiabatically mapped to the modes of the larger multi-mode waveguide. In this way, the inputs of the lantern can be individually excited which would ultimately excite the individual modes of the output multimode waveguide.

Figure 10:
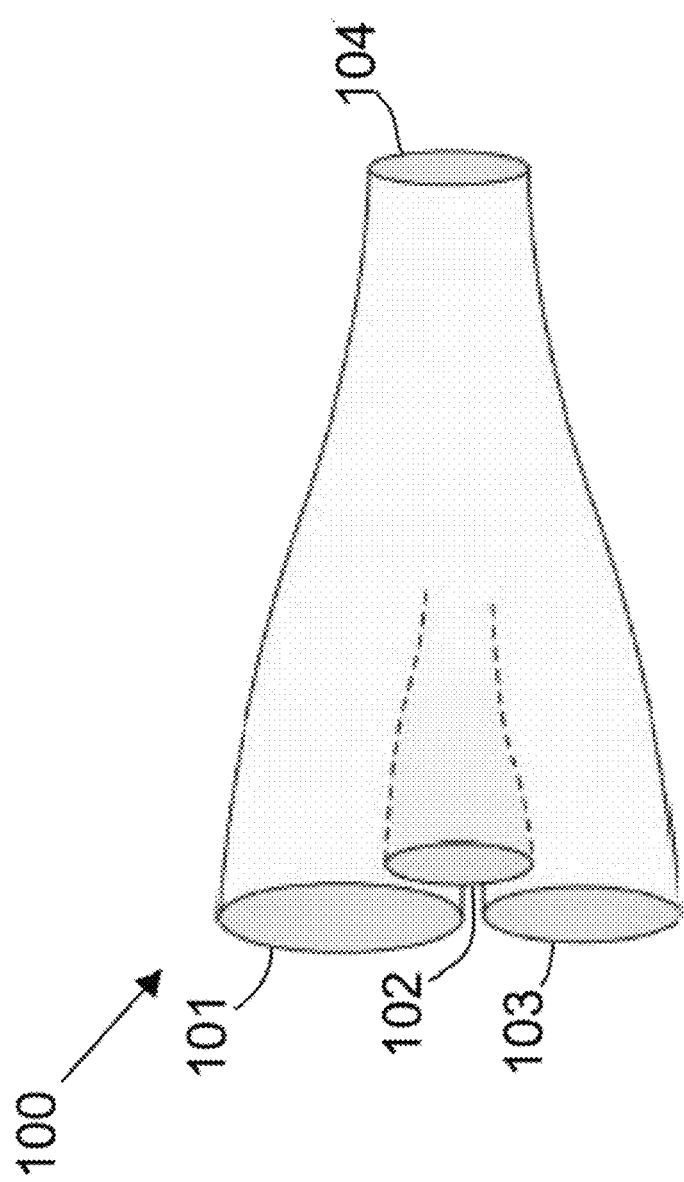
FIG. 10 shows a schematic of a photonic crystal lantern for adiabatic mode transformation.

FIG. 10 shows a schematic of a photonic crystal lantern 100. This tapered structure has multiple inputs 101-103 and a single output core 104. The multiple input cores each have different propagation constants (B1, B2, and B3 in this case), and the single output core is multi-mode, each mode having its own propagation constant (B1', B2', and B3' in this case). If a beam is launched into one of the input cores, it will map to its corresponding output core. In this way, individual modes in a multimode fiber can be excited.

Simultaneous Illumination of all Desired Modes (with a Spatial Light Modulator or Other Means)

The mode excitation methods of evanescent (resonant) coupling and adiabatic mode transformation described above excite individual waveguide modes that combine to create a desired output profile, with the number of control channels limited to (at most) the number of modes supported by the waveguide. In another regime, one can illuminate all desired modes simultaneously by use of a pair of spatial light modulators, or other beam shaping device. It should be noted that while such beam shaping techniques are capable of producing a wide range of output beams, this comes at a cost of requiring a higher number of control channels. Spatial light modulators can illuminate the input port of the amplifier with an arbitrary pattern which will excite a set of modes with unique amplitudes and phases. This pattern at the input will transform its intensity profile through propagation in the fiber and interference between the modes and eventually exit the fiber with a different pattern. However, by using feedback from the output beam which will adjust the input beam pattern continuously, an arbitrary output of a desired shape can be created. Using the set up shown in FIG. 11, this technique has been demonstrated to excite a single desired mode. However, the exact same experimental setup could be used to excite a set of modes. The only difference would be the algorithm used to determine the input profile. Patents for exemplary mode converter useable in the present invention have been issued to the present assignee, Lawrence Livermore National Security, LLC (LLNS). The patents are U.S. Pat. No. 9,124,066 (incorporated herein by reference) and U.S. Pat. No. 9,373,928 (incorporated herein by reference. This same/similar technique can be used to excite the desired set of modes in a multimode ribbon fiber to generate an arbitrary output.

Figure 11:
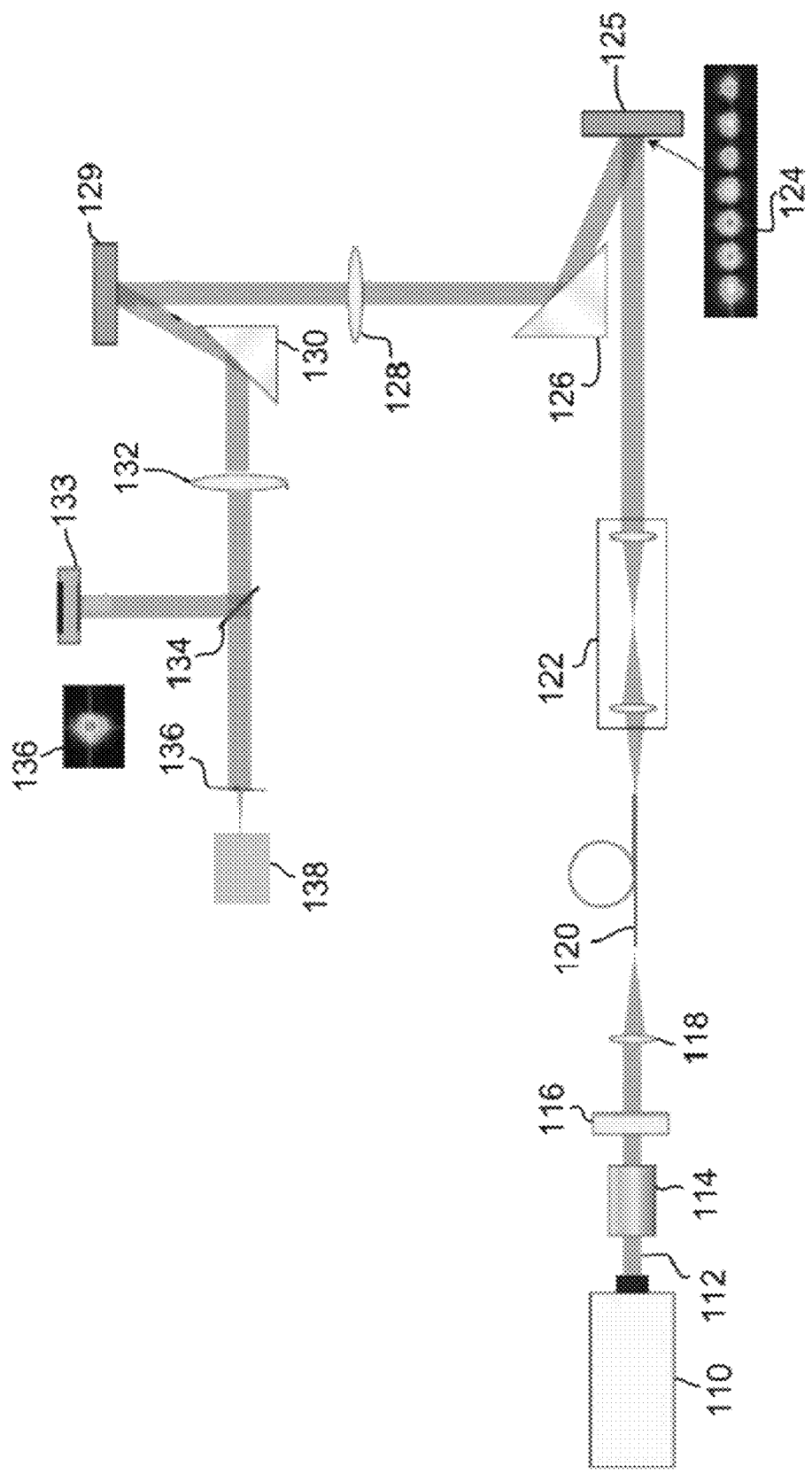
FIG. 11 shows a pair of SLMs used for transforming a ribbon mode coming out of a ribbon fiber into a Gaussian beam.

In the experimental set up of FIG. 11, a CW laser 110, provides a 1053 nm, $TEM_{00}$ mode, linearly-polarized, single-longitudinal-mode beam 112 which successively propagates through isolator 114, half-wave plate 116, lens 118, ribbon fiber 120 and magnifying telescope 122. The ribbon fiber, in this case has a 5 µm×50 µm core. The magnifying telescope produces the near field of the fiber-facet (with ~3.3 mm $FW1/e^2$ 7-lobed intensity profile 124) at the first spatial light modulator (SLM-1)125. The beam from SLM-1 is reflected from right angle prism 126, through lens 128, and is then reflected from SLM-2129 and prism 130. The beam then passes through lens 132, beamsplitter 134, pinhole 136 and into power meter 138. A portion of the beam reflected from beamsplitter 134 is collected in the far-field of SLM-2 camera 133, which shows the mode 136 at that point. A pair of SLMs is used to transform a ribbon mode coming out of a ribbon fiber into a Gaussian beam. The first SLM (SLM-1) changes the phase across the beam profile, and a lens performs a Fourier transform on the beam converting phase to amplitude and amplitude to phase. The second SLM (SLM-2) changes the phase of the far field thus fully converting the mode. The same technique works in reverse. The same technique can be used to simultaneously illuminate a set of modes with the correct feedback from the output. Thus, a single mode beam directed into the system in reverse can produce a multilobed intensity profile for input into the ribbon fiber, such that interference within the core of the ribbon fiber produces a desired intensity profile useful for example, in additive manufacturing. This is but one way to introduce a desired input into the ribbon fiber to produce a desired output intensity profile. Those skilled in the art, based on this disclosure, will recognize other methods for providing the desired input beam to a ribbon fiber.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

We claim:
1. A method, comprising:
   providing a mode selective element that supports transverse modes having lobes only distributed along a line in one direction; and
   directing one or more of said transverse modes into said mode selective element, wherein said transverse modes interfere one with another in said mode selective element to produce a user defined patterned intensity laser profile output beam.
2. The method of claim 1, wherein said mode selective element is selected from the group consisting of a ribbon fiber laser, a waveguide and a resonant cavity.
3. The method of claim 1, wherein said user defined patterned intensity laser profile output beam comprises a stripe of intensity pixels.
4. The method of claim 3, wherein the intensity of individual intensity pixels of said stripe of intensity pixels is determined through interference of said plurality of modes.
5. The method of claim 3, wherein said stripe of intensity pixels is used for laser materials processing.
6. The method of claim 5, wherein said laser materials processing comprises additive manufacturing.
7. The method of claim 5, wherein said laser materials processing comprises powder bed fusion additive manufacturing.
8. The method of claim 1, wherein said patterned intensity laser profile output beam includes a set of intensity pixels in a line.
9. The method of claim 1, wherein said mode selective element produces a randomly varying intensity profile, wherein said step of directing one or more of said transverse modes into said mode selective element comprises directing a chosen set of modes into said laser such that multimode interference produces said user defined patterned intensity laser profile output beam.
10. The method of claim 9, further comprising relaying said output beam onto an additive manufacturing print plane.
11. The method of claim 9, wherein the step of directing a chosen set of modes into said laser is carried out by evanescent coupling from a set of coupled waveguides.
12. The method of claim 9, wherein the step of directing a chosen set of modes into said laser is carried out through adiabatic mode transformation through a tapered fiber structure.
13. The method of claim 12, wherein said tapered fiber structure comprises a photonic crystal lantern.
14. The method of claim 9, wherein the step of directing a chosen set of modes into said laser is carried out with a spatial light modulator (SLM).
15. The method of claim 14, wherein the output of said SLM is used to seed an input profile to a ribbon amplifier, the output of which is utilized in the step of directing a plurality of modes into said laser.
16. The method of claim 1, wherein said output beam is utilized to process a part in an additive manufacturing process, wherein said beam is swept across a part, wherein a plurality of rows of pixels are simultaneously printed on said part.
17. The method of claim 1, wherein said output beam is imaged onto a 3D printing surface.
18. The method of claim 1, further comprising controlling said plurality of modes.
19. The method of claim 1, wherein said mode selective element comprises a relatively narrow dimension and a relatively wide dimension, wherein said mode selective element supports only a single mode in said relatively narrow dimension and supports multiple modes in said relatively wide dimension.
20. An apparatus, comprising:
   a mode selective element that supports transverse modes having lobes distributed only along a line in one direction; and
   means for directing one or more of said transverse modes into said mode selective element, wherein said transverse modes interfere one with another in said mode selective element to produce a user defined patterned intensity laser profile output beam.
21. The apparatus of claim 20, wherein said mode selective element is selected from the group consisting of a ribbon fiber laser, a waveguide and a resonant cavity.

22. The apparatus of claim 21, wherein said ribbon fiber laser comprises a slab core.

23. The apparatus of claim 20, wherein said means for directing one or more of said transverse modes into said mode selective element comprises a mode filter configured to excite said modes to produce said desired output profile.

24. The apparatus of claim 23, wherein said mode filter is configured to excite said modes before they are combined in said laser medium.

25. The apparatus of claim 20, wherein said means for directing one or more of said transverse modes into said mode selective element comprises a spatial light modulator (SLM).

26. The apparatus of claim 25, further comprising means for seeding said mode selective element with a low power pattern generated with said SLM to produce said desired output profile.

27. The apparatus of claim 20, wherein said means for directing one or more of said transverse modes into said mode selective element comprises means for evanescent coupling of a plurality of modes into said mode selective element to produce said desired output profile.

28. The apparatus of claim 20, wherein said means for directing one or more of said transverse modes into said mode selective element comprises a photonic crystal lantern configured for coupling a plurality of modes into mode selective element to produce said desired output profile.

29. The apparatus of claim 20, further comprising a feedback mechanism configured to produce said desired output profile.

30. The apparatus of claim 20, further comprising means for controlling said transverse modes.

\* \* \* \* \*

UNITED STATES PATENT AND TRADEMARK OFFICE
CERTIFICATE OF CORRECTION

PATENT NO. : 10,978,849 B2
APPLICATION NO. : 16/263422
DATED : April 13, 2021
INVENTOR(S) : Derrek R. Drachenberg et al.

Page 1 of 1

It is certified that error appears in the above-identified patent and that said Letters Patent is hereby corrected as shown below:

On the Title Page

Please remove item (72):
"(72) Inventors: Derrek R. Drachenberg, Livermore, CA (US); Jay W. Dawson, Livermore, CA (US); Gabriel M. Guss, Manteca, CA (US); Paul H. Pax, Livermore, CA (US); Alexander M. Rubenchik, Livermore, CA (US); Manyilibo J. Matthews, Livermore, CA (US)"

Please replace with:
--(72) Inventors: Derrek R. Drachenberg, Livermore, CA (US); Jay W. Dawson, Livermore, CA (US); Gabriel M. Guss, Manteca, CA (US); Paul H. Pax, Livermore, CA (US); Alexander M. Rubenchik, Livermore, CA (US); Manyalibo J. Matthews, Livermore, CA (US)--

Signed and Sealed this
Twenty-seventh Day of September, 2022

Katherine Kelly Vidal
*Director of the United States Patent and Trademark Office*